(12) United States Patent
Schall (10) Patent No.: US 12,355,612 B2
(45) Date of Patent: Jul. 8, 2025

(54) COMPUTER-IMPLEMENTED METHOD FOR OPERATING A TERMINAL WITH HIGH AVAILABILITY IN A NETWORK (71) Applicant: Siemens Aktiengesellschaft, Munich (DE)

(72) Inventor: Daniel Schall, Hollabrunn (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/574,477

(22) PCT Filed: Jun. 24, 2022

(86) PCT No.: PCT/EP2022/067343
§ 371 (c)(1),
(2) Date: Dec. 27, 2023

(87) PCT Pub. No.: WO2023/274874
PCT Pub. Date: Jan. 5, 2023

(65) Prior Publication Data
US 2024/0323074 A1  Sep. 26, 2024

(30) Foreign Application Priority Data
Jun. 30, 2021  (EP) .................................... 21182916

(51) Int. Cl.
*H04L 41/0659*  (2022.01)
*H04L 41/0681*  (2022.01)
*H04L 41/0816*  (2022.01)

(52) U.S. Cl.
CPC ...... *H04L 41/0661* (2023.05); *H04L 41/0681* (2013.01); *H04L 41/0816* (2013.01)

(58) Field of Classification Search
CPC ............. H04L 41/0661; H04L 41/0681; H04L 41/0816
See application file for complete search history.

(56) References Cited

U.S. PATENT DOCUMENTS 10,715,411 B1    7/2020  Jacob Da Silva et al.
11,386,339 B2 *  7/2022  Liu ........................ H04L 67/567
(Continued)

FOREIGN PATENT DOCUMENTS

KR    20210076641 A  *  6/2021  ........... G06F 9/5072

OTHER PUBLICATIONS

PCT International Search Report dated Oct. 21, 2022 based on PCT/EP2022/067343 filed Jun. 24, 2022.

*Primary Examiner* — Todd L Barker
(74) *Attorney, Agent, or Firm* — Cozen O'Connor (57) ABSTRACT A method for operating a terminal with high availability in a network, where a memory stores an identifier, for a backup device of a first edge device, which relates to a second edge device, stores a model for operating the terminal and stores information about the connection configuration between the first and second edge devices, the monitoring device and the terminal, where the first edge device periodically sends a signal about its correct operation, the signal is received by the monitoring device, and detection of an absent or erroneous signal results in an associated error device being detected, and the model and the connection configuration of the error device being transferred from the memory to a substitute device, the substitute device being determined via the identifier associated with the absent or erroneous signal, and the substitute device operating the terminal using the received model and the connection configuration.

10 Claims, 5 Drawing Sheets (56) References Cited

U.S. PATENT DOCUMENTS

| | | |
|---|---|---|
| 2018/0032915 A1* | 2/2018 | Nagaraju ............... G06V 10/95 |
| 2018/0295546 A1 | 10/2018 | Crawford |
| 2020/0099575 A1 | 3/2020 | Jan |
| 2020/0272920 A1* | 8/2020 | Liu ....................... G06N 5/043 |
| 2021/0144517 A1 | 5/2021 | Guim et al. |
| 2021/0325861 A1* | 10/2021 | Hou ................ G05B 19/41835 |
| 2023/0177349 A1* | 6/2023 | Balakrishnan .......... H04L 67/10 |
| | | 706/25 |

* cited by examiner

COMPUTER-IMPLEMENTED METHOD FOR OPERATING A TERMINAL WITH HIGH AVAILABILITY IN A NETWORK

CROSS-REFERENCE TO RELATED APPLICATIONS

This is a U.S. national stage of application No. PCT/EP2022/067343 filed 24 Jun. 2022. Priority is claimed on European Application No. 21182916.3 filed 30 Jun. 2021, the content of which is incorporated herein by reference in its entirety.

BACKGROUND OF THE INVENTION

1. Field of the Invention

The invention relates to a computer program, an electronically readable data carrier, a data carrier signal, a system and a computer-implemented method for operating a terminal with high availability in a network, comprising a first edge device that operates the terminal using a model, at least one second edge device, and a monitoring device with cloud storage.

2. Description of the Related Art

Edge computing is an important approach to bringing advanced processing capabilities into the factory. Data processing ranges from simple aggregation of data points to advanced artificial intelligence (AI) methods for analyzing complex machine behavior or optimizing a production system.

There are various concepts for high-availability systems in a cloud and fog computing context as well as for control systems.

A common problem with current edge systems is that they also crash in the event of an abort by an edge device. There are no known "failover" mechanisms at an edge that react to such aborts.

With regard to edge computing and especially for maintaining the availability of artificial intelligence (AI) models, there are currently no known mechanisms that react automatically to faults.

SUMMARY OF THE INVENTION

In view of the forgoing, it is therefore an object of the invention to provide a system architecture that reacts to faults and errors at an edge and thus ensures uninterrupted operation.

This and other objects and advantages are achieved in accordance with the invention by a method in which a storage is used to store at least one identifier for a failure backup device for the first edge device, where the identifier relates to the at least one second edge device, and the model for operating the terminal and information regarding the communication configuration between the first and the at least one second edge device, the monitoring device and the terminal, and the first edge device periodically also sends a signal about the correct operation thereof in the network, and the signal is received by the monitoring device, and if a missing or erroneous signal is detected, then an associated defective device is detected, and the model and communication configuration of the defective device is transmitted from the store to a backup device, and where the backup device is determined by the identifier associated with the missing or erroneous signal, and the backup device operates the terminal using the received model and communication configuration.

This ensures that the availability of the terminal is increased by having another device in the network take over operation, where the backup device is as closely equivalent as possible to the defective device including the current operating environment.

This means that particularly resource-saving and efficient operation of the entire system can be achieved, and the fact that both the model and the communication configuration actually required are taken into account allows the backup device to be selected in a particularly advantageous manner.

A fault in an edge device is detected by using an operating status signal, also known as a "heartbeat" or "watchdog" signal.

A healthy edge device can be identified by a correctly received signal. Regular reception of this signal is thus an indicator that the respective edge device is working correctly and is operating an assigned IoT terminal, i.e., detecting or receiving operating parameters, making a prediction about the operation of the terminal or sending control signals to the terminal, for example.

The invention provides that a backup edge device is determined in a simple manner and that the backup edge device assumes operation of the defective device.

It is advantageous that no additional hardware is required in order to keep system complexity and costs low.

Moreover, it is advantageous that the architecture in accordance with the invention is capable of self-configuration or self-recovery, so that no time-consuming commissioning, e.g., by IT specialists, is required.

It is also advantageous that no complex and complicated cluster management is required, as is the case with a Kubernetes cluster, for example, and that the inventive solution can execute on an existing edge infrastructure, e.g., as a software extension.

The model for operating the terminal and the information relating to the communication configuration between the first and at least one second edge device, the monitoring device and the terminal can be redetermined during operation of the terminal, e.g., by the respective devices themselves or by the monitoring device and updated in the store, e.g., regularly, on a runtime-controlled or event-controlled basis.

In a further embodiment of the invention, for the at least one second edge device, at least one identifier for a failure backup device for the at least one second edge device is stored in the store, and the at least one second edge device additionally periodically sends a signal about the correct operation of the respective device in the network. This increases the availability of a plurality of edge devices in joint operation mode.

In a further embodiment of the invention, at least two second edge devices are provided, and at least two identifiers for a failure backup device are stored in the store for the first and the at least two second edge devices, and the identifiers are queued, and the failure backup device is selected from the identifiers in accordance with the queuing. This ensures that a predetermined sequence of failure devices is provided, thereby enabling a plurality of edge device failures to be detected and resolved.

In a further embodiment of the invention, the at least two identifiers for failure backup devices have a sorting that takes into account the computing capacity or memory capacity of the terminal assigned according to the communication configuration.

This ensures that performance is predefined for a failure device, which means that the backup device constitutes a replacement that is the closest possible equivalent of the defective device.

Moreover, failure performance can be specified in addition to the actually required performance to ensure joint operation with own terminal and backup device.

In the context of the present invention, sorting refers to a prioritization of a sequence of failure devices. In other words, in the event of an edge device failure, the sorting is searched in ascending order until a suitable available edge device can be retrieved from the priority list.

In a further embodiment of the invention, the at least two identifiers for failure backup devices have a sorting that takes into account the geographical proximity of the terminal assigned according to the communication configuration. This ensures that performance, particularly in terms of latency requirements, is predefined for a failure device, thereby ensuring that the backup device constitutes a replacement for the defective device that is as closely equivalent as possible.

In a further embodiment of the invention, the at least two identifiers for failure backup devices have a sorting that takes into account at least one availability parameter of the terminal assigned according to the communication configuration. This ensures that performance, in particular transmission rate requirements, is predefined for a failure device, where the backup device thereby constitutes a replacement for the defective device that is as closely equivalent as possible.

In a further embodiment of the invention, it is provided that the at least two identifiers for failure backup devices have a sorting which takes into account at least one availability parameter of the terminal assigned according to the communication configuration (CC). This ensures that performance, particularly in terms of availability requirements, is predefined for a failure device, where the backup device thereby constitutes a replacement for the defective device that is as closely equivalent as possible. Moreover, in addition to its own required availability, failure performance can be specified to ensure joint operation with own terminal and backup device.

In a further embodiment of the invention, at least two independent communication paths are provided in the network between the first edge device, the at least one second edge device, the terminal and the monitoring device. This further increases the availability of the system.

The objects and advantages in accordance with the invention are also achieved by a computer program comprising instructions which, when executed by a computer, cause the computer to implement the method in accordance with the disclosed embodiments of the invention.

The objects and advantages in accordance with the invention are also achieved by an electronically readable data carrier with readable control information stored thereon which includes at least the computer program in accordance with the invention and is which is configured such that, when the data carrier is used in a computing device, it implements the method in accordance with disclosed embodiment of the invention.

The objects and advantages in accordance with the invention are also achieved by a data carrier signal that transmits the computer program in accordance with the invention.

The objects and advantages in accordance with the invention are also achieved by a system for operating a terminal with high availability in a network, comprising a first edge device that operates a terminal, at least one second edge device, and a monitoring device with cloud storage, where the system is configured to implement the method in accordance with disclosed embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be explained in more detail with reference to an exemplary embodiment illustrated in the accompanying drawings, in which.

DETAILED DESCRIPTION OF THE EXEMPLARY EMBODIMENT

Only important elements of the system according to the invention are shown in the following figures. Other components will obviously be necessary to operate the system. However, for reasons of clarity, they have not been shown.

Figure 1:
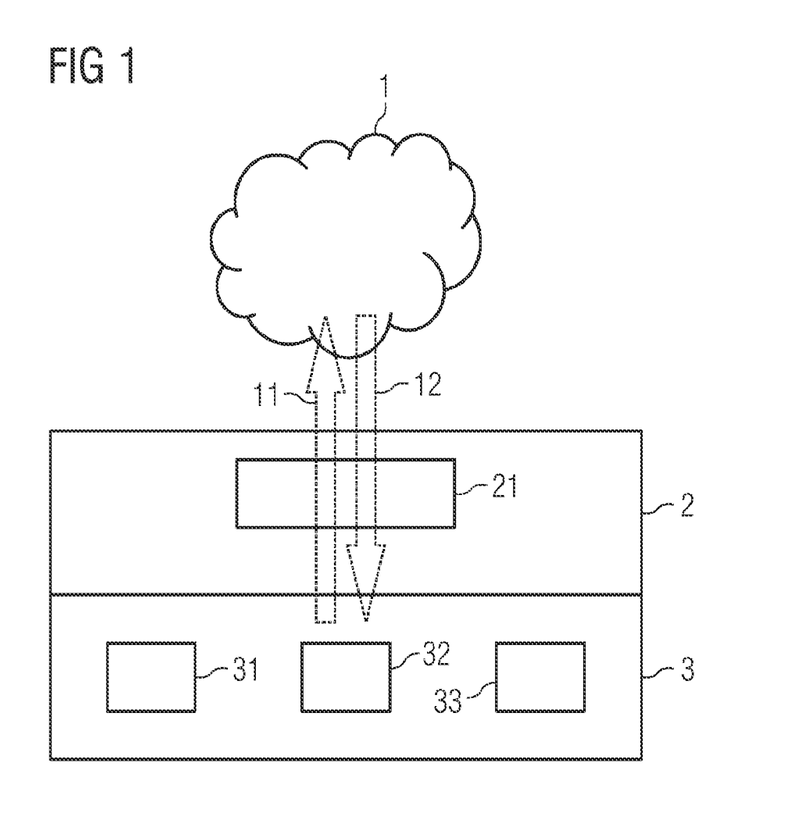
FIG. 1 shows a block diagram with an exemplary industrial edge system in accordance with the invention.

FIG. 1 provides an overview of the Siemens Industrial Edge System, in which data 11 is transferred from a device to a cloud 1 and, conversely, data 12 is transferred from the cloud to a device.

An edge device 21 located at factory level 2 can host certain apps. An app can also be an artificial intelligence (AI) model with glue code for integration into the production system.

The devices 31, 32, 33 are located at field/device level 3.

Figure 2:
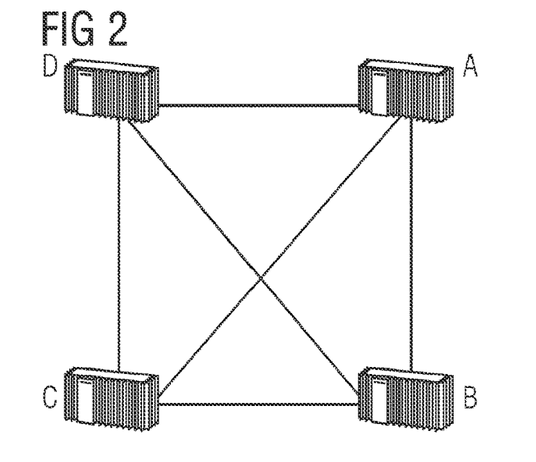
FIG. 2 shows exemplary interconnected edge devices in a P2P edge communication topology in accordance with the invention.

FIG. 2 shows a P2P edge communication topology with peers comprising a set of edge devices A-D that can communicate with each other over a standard TCP/IP network, where each edge device includes a processor (CPU) and memory. Examples of edge device include The SIMATIC IPC127E, IPC227E, IPC427E and IPC847E Industrial Edge Device manufactured by the Siemens company.

The edge devices A-D can recognize each other individually and mutually using conventional network mechanisms.

Figure 3:
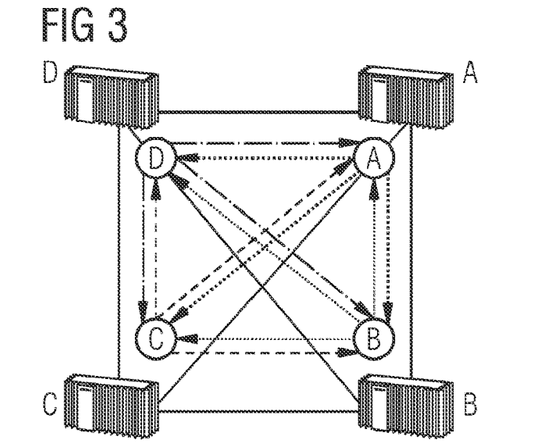
FIG. 3 shows a P2P publish-subscribe pattern via MOTT for the exemplary interconnected edge devices of FIG. 2.

FIG. 3 shows an exemplary P2P publish-subscribe pattern supported by an MQTT protocol of edge devices A-D.

Message Queuing Telemetry Transport (MQTT) is an open network protocol for machine-to-machine communication that enables telemetry data in the form of messages to be transmitted between devices, despite high latency or limited networks.

A subscriber subscribes to topics from another subscriber. This relationship is entered in the communication matrix.

An example of subscribers for publish-subscribe procedures is shown below in Table 1.

In the example shown, in the column for device A, it can be seen that device A has subscribed to messages concerning changes to devices B, C, D, which means that each subscriber knows the "health status" of all the other devices.

TABLE 1

Subscribed subscribers for publish-subscribe procedure

| Subscriber | Backup | | | |
|---|---|---|---|---|
| | A | B | C | D |
| A | — | x | x | x |
| B | x | — | x | x |
| C | x | x | — | x |
| D | x | x | x | — |

Figure 4:
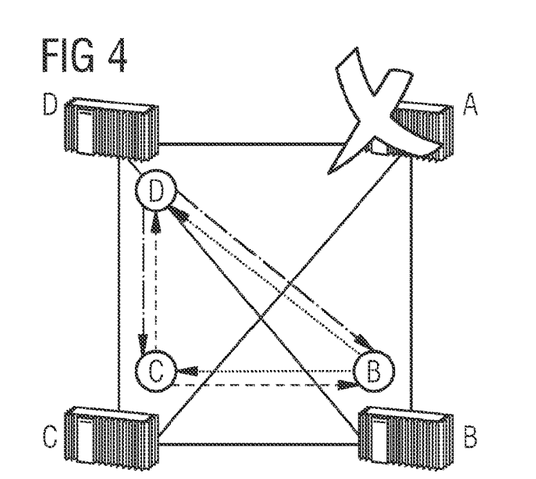
FIG. 4 shows the exemplary interconnected edge devices of FIG. 2 with a failed edge device.

FIG. 4 shows an example of automatic error detection. In this example, subscriber A has failed compared to FIG. 3.

A "heartbeat" mechanism HB is used between edge devices A-D, which defines the set of edge devices ED, where a request is periodically sent to all other participating devices notifying them of the current health status of the sending device.

If no heartbeat signal HB is received within a predefined time interval, then it is inferred that the device is no longer functioning and a backup device must be selected to assume operation of the non-functioning device.

Table 2 shows the failure of subscriber A.

TABLE 2

Failure of subscriber A

| Subscriber | Backup | | | |
|---|---|---|---|---|
| | A | B | C | D |
| A | — | | | |
| B | | — | x | x |
| C | | x | — | x |
| D | | x | x | — |

Figure 5:
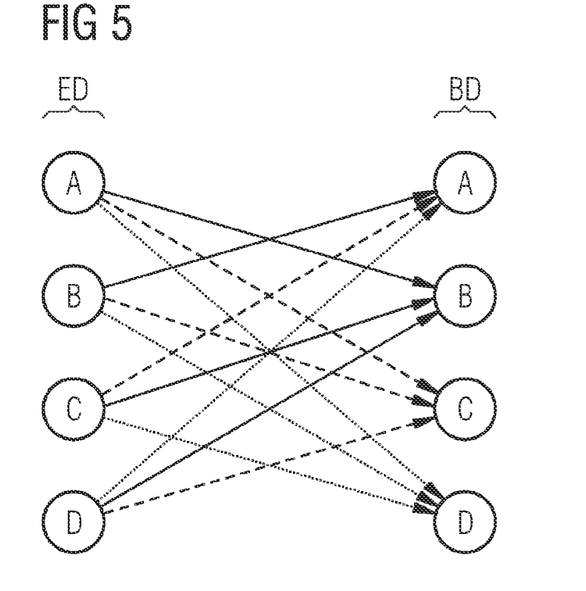
FIGS. 5-6 show an exemplary backup peers procedure with priorities via peers in accordance with the invention.

FIG. 5 shows an exemplary backup peers procedure with priorities, where the distribution of priorities across peers is random.

In the illustrated graph, the backup peers, i.e., the backup edge devices, are shown, where the line width of the arrows is intended to indicate prioritization.

In the figure, priority 1 is represented by solid arrows, priority 2 by dashed arrows and priority 3 by dotted arrows.

This representation can also be in tabular form, see Table 3.

Each device A-E is shown in a table with priorities.

In Table 3, first line, it can be seen that device A is the backup with priority 1 for device B, the backup with priority 2 for device D and the backup with priority 3 for device C.

TABLE 3

Backup subscribers with random priority distribution

| Subscriber | Backup | | | |
|---|---|---|---|---|
| | A | B | C | D |
| A | — | 1 | 3 | 2 |
| B | 1 | — | 2 | 3 |
| C | 2 | 1 | — | 3 |
| D | 3 | 1 | 2 | — |

Figure 6:
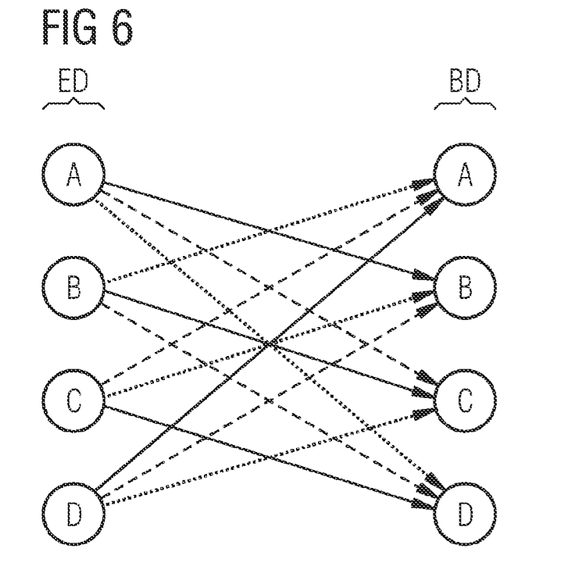

FIG. 6 shows an exemplary backup peers procedure with priorities, where the distribution of priorities across peers is homogeneous.

In the figure, priority 1 is represented by solid arrows, priority 2 by dashed arrows and priority 3 by dotted arrows.

A tabular representation of FIG. 5 is given in Table 4.

The priorities are assigned row-wise in ascending order.

This can be advantageous if, for example, devices A-D are prioritized according to geographical proximity or similar device properties, such as computing capacity or memory capacity, are sorted in the table and the "nearest" device shall be selected as the backup device by means of the homogeneous distribution.

TABLE 4

Backup subscribers with homogeneous priority distribution

| Subscriber | Backup | | | |
|---|---|---|---|---|
| | A | B | C | D |
| A | — | 1 | 2 | 3 |
| B | 3 | — | 1 | 1 |
| C | 2 | 3 | — | 1 |
| D | 1 | 2 | 3 | — |

Figure 7:
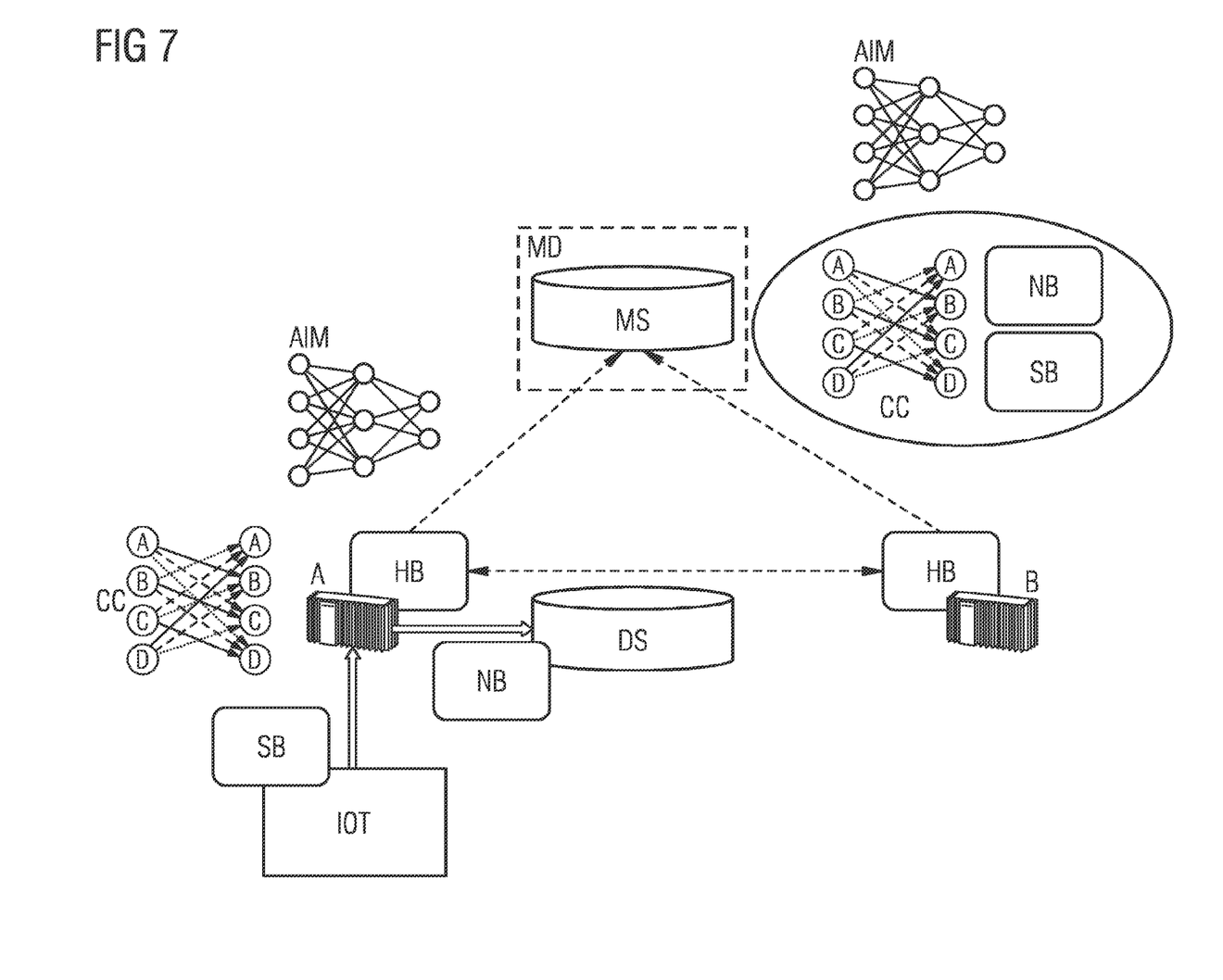
FIG. 7 shows a flowchart in a system architecture for the recovery of AI models after an error in accordance with the invention.

FIG. 7 shows a flowchart in a system architecture in which an AI model AIM is operated by an application on device A.

Current data is acquired by a connected terminal IoT, e.g., a machine, and transmitted to device A via the "southbound" communication path SB.

The data is processed using the AI model AIM and transmitted to a cloud or local data store DS via the "northbound" communication path NB together with information regarding the communication configuration CC.

The edge device A additionally sends (in a periodically recurring manner) a "heartbeat" signal HB to other peers, i.e., the devices B-D in this example, and also to a monitoring device MD having a model store MS.

The model store MS stores artifacts for providing AI models and the relevant configurations of the connections CC (communication configuration) from and between the "southbound" communication path SB and the "northbound" communication path NB.

The monitoring device MD has a computing apparatus for performing various backup peers process steps, such as monitoring the "heartbeat" signal HB or providing or encrypting data from the store MS.

Figure 8:
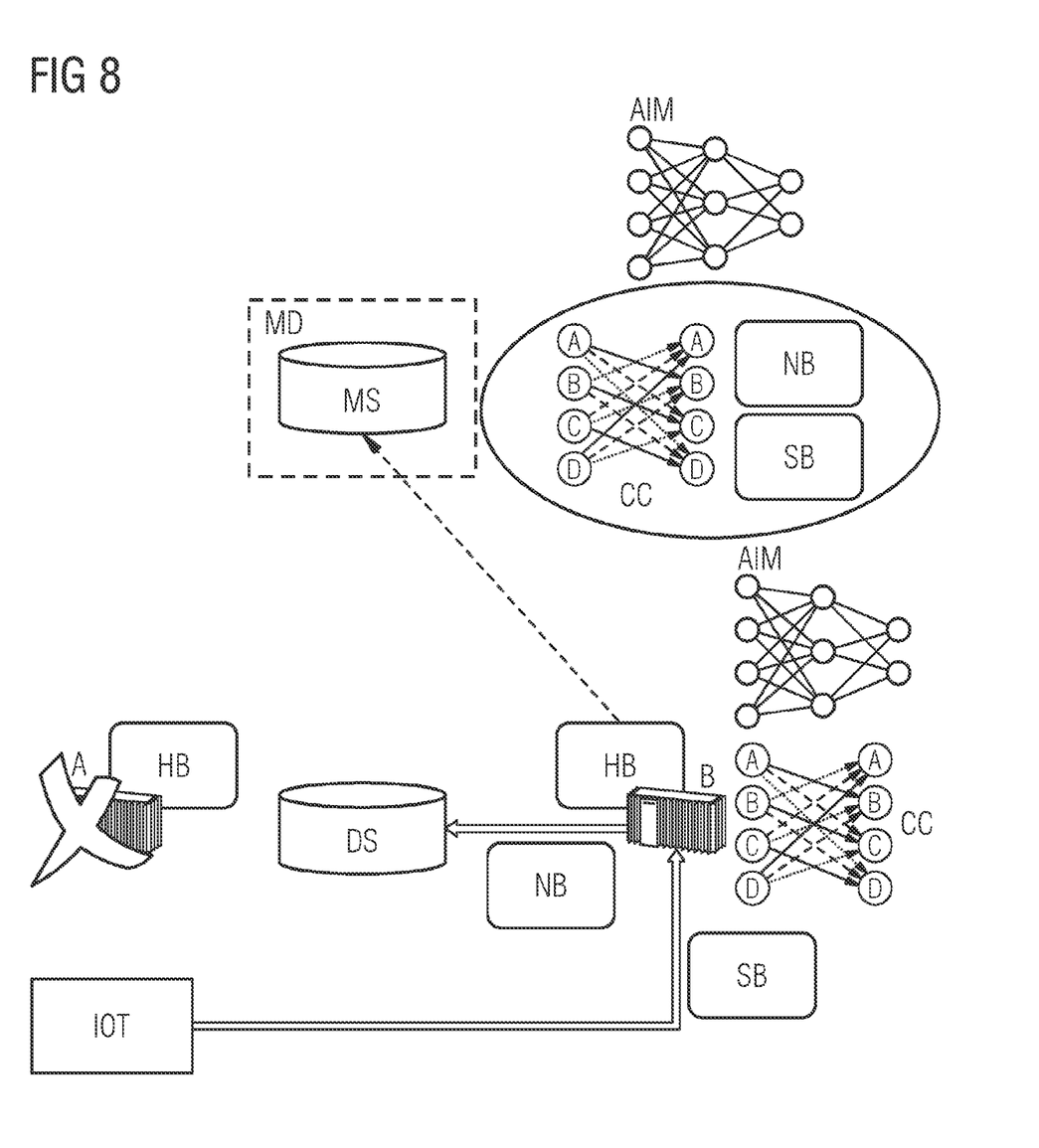
FIG. 8 shows a flowchart for restoring AI models after an error in accordance with the invention.

FIG. 8 shows a flowchart in the system architecture according to FIG. 7 for restoring the AI model AIM after a fault in the edge device A.

In the event of a fault in edge device A, device A does not send a "heartbeat" signal HB, either to the other devices B-D or to the monitoring device MD.

This is detected by the monitoring device MD. Device B is then allowed to retrieve the respective model AIM and the associated communication configuration CC from the model store MS.

The monitoring device MD now encrypts the artifacts using the public key of device B and the private key of the monitoring device MD.

The monitoring device MD then sends a link to device B with a reference to the encrypted data set.

Device B receives the link, loads the corresponding artifact data from the model store MS of the monitoring device MD and decrypts it using the private key of device B and the public key of the model store MS.

Device B then loads the communication configuration CC, creates the AI model AIM from the decrypted artifact data and applies the AI model AIM to the machine IoT instead of the failed device A.

The model AIM and the configuration CC can also be transmitted in other ways.

In summary, the entire data and AI flow was restored quickly and easily without manual intervention.

Prediction gaps can even be bypassed by buffering the data on a controller of the machine IoT, for example, and transferring the buffered data as soon as the backup edge device is available again and the AI model AIM is loaded.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A computer-implemented method for operating a terminal with high availability in a network comprising a first edge device which operates the terminal via an artificial intelligence (AI) model, at least one second edge device and a monitoring device having a store in the cloud, the method comprising:
   storing in the store at least one identifier for a failure backup device of the first edge device, said identifier relating to the at least one second edge device, and the AI model for operating the terminal and information relating to a communication configuration between the first and the at least one second edge device, the monitoring device and the terminal;
   sending periodically, by the first edge device, a signal about correct operation in the network of the first edge device;
   receiving the signal by the monitoring device, an associated defective device is recognized if a missing or erroneous signal is detected; and
   transmitting the AI model and the communication configuration of the defective device from the store to a backup device;
   wherein the backup device is determined by the identifier associated with the missing or erroneous signal; and
   wherein the backup device operates the terminal device utilizing the received AI model and the communication configuration.

2. The method as claimed in claim 1, further comprising:
   storing, for the at least one second edge device, at least one identifier for a failure backup device for the at least one second edge device in the store; and
   sending periodically, by the at least one second edge device, a signal about correct operation of a respective device in the network.

3. The method as claimed in the claim 1, wherein the network includes at least two second edge devices, and at least two identifiers for a failure backup device are each stored in the store for the first and the at least two second edge devices, the at least two identifiers are queued, and the failure backup device is selected from the queued identifiers in accordance with the queuing.

4. The method as claimed in claim 3, wherein the at least two failure backup device identifiers have a sorting which reflects a computing capacity or memory capacity of the terminal assigned in accordance with the communication configuration.

5. The method as claimed in claim 3, wherein the at least two failure backup device identifiers have a sorting which takes into account a geographical proximity of the terminal assigned accordance with the communication configuration.

6. The method as claimed in claim 3, wherein the at least two failure backup device identifiers have a sorting which takes into account at least one availability parameter of the terminal assigned according to the communication configuration.

7. The method as claimed in claim 3, wherein the at least two failure backup device identifiers have a sorting which takes into account at least one availability parameter of the terminal assigned accordance with the communication configuration.

8. The method as claimed in claim 1, wherein at least two independent communication paths are provided in the network between the first edge device, the at least one second edge device, the terminal, and the monitoring device.

9. A non-transitory electronically readable data carrier including readable control information stored thereon which comprises at least a computer program which, when executed by a computing device, causes operation of a terminal with high availability in a network comprising a first edge device which operates the terminal via an artificial intelligence (AI) model, at least one second edge device and a monitoring device having a store in the cloud, the computer program comprising:
   program code for storing in the store at least one identifier for a failure backup device of the first edge device, said identifier relating to the at least one second edge device, and the AI model for operating the terminal and information relating to a communication configuration between the first and the at least one second edge device, the monitoring device and the terminal;
   program code for sending periodically, by the first edge device, a signal about correct operation in the network of the first edge device;
   program code for receiving the signal by the monitoring device, an associated defective device is recognized if a missing or erroneous signal is detected; and
   program code for transmitting the AI model and the communication configuration of the defective device from the store to a backup device;

wherein the backup device is determined by the identifier associated with the missing or erroneous signal; and wherein the backup device operates the terminal device utilizing the received AI model and the communication configuration.

10. A system for operating a terminal with high availability in a network, comprising:
- a first edge device which operates the terminal utilizing an artificial intelligence (AI) model,
- at least one second edge device; and
- a monitoring device with a store in the cloud;

wherein the system is configured to:
- store in the store at least one identifier for a failure backup device of the first edge device, said identifier relating to the at least one second edge device, and the AI model for operating the terminal and information relating to a communication configuration between the first and the at least one second edge device, the monitoring device and the terminal;
- send periodically, by the first edge device, a signal about correct operation in the network of the first edge device;
- receive the signal by the monitoring device, an associated defective device is recognized if a missing or erroneous signal is detected; and
- transmit the AI model and the communication configuration of the defective device from the store to a backup device;

wherein the backup device is determined by the identifier associated with the missing or erroneous signal; and wherein the backup device operates the terminal device utilizing the received AI model and the communication configuration.

* * * * *